Patented Sept. 21, 1943

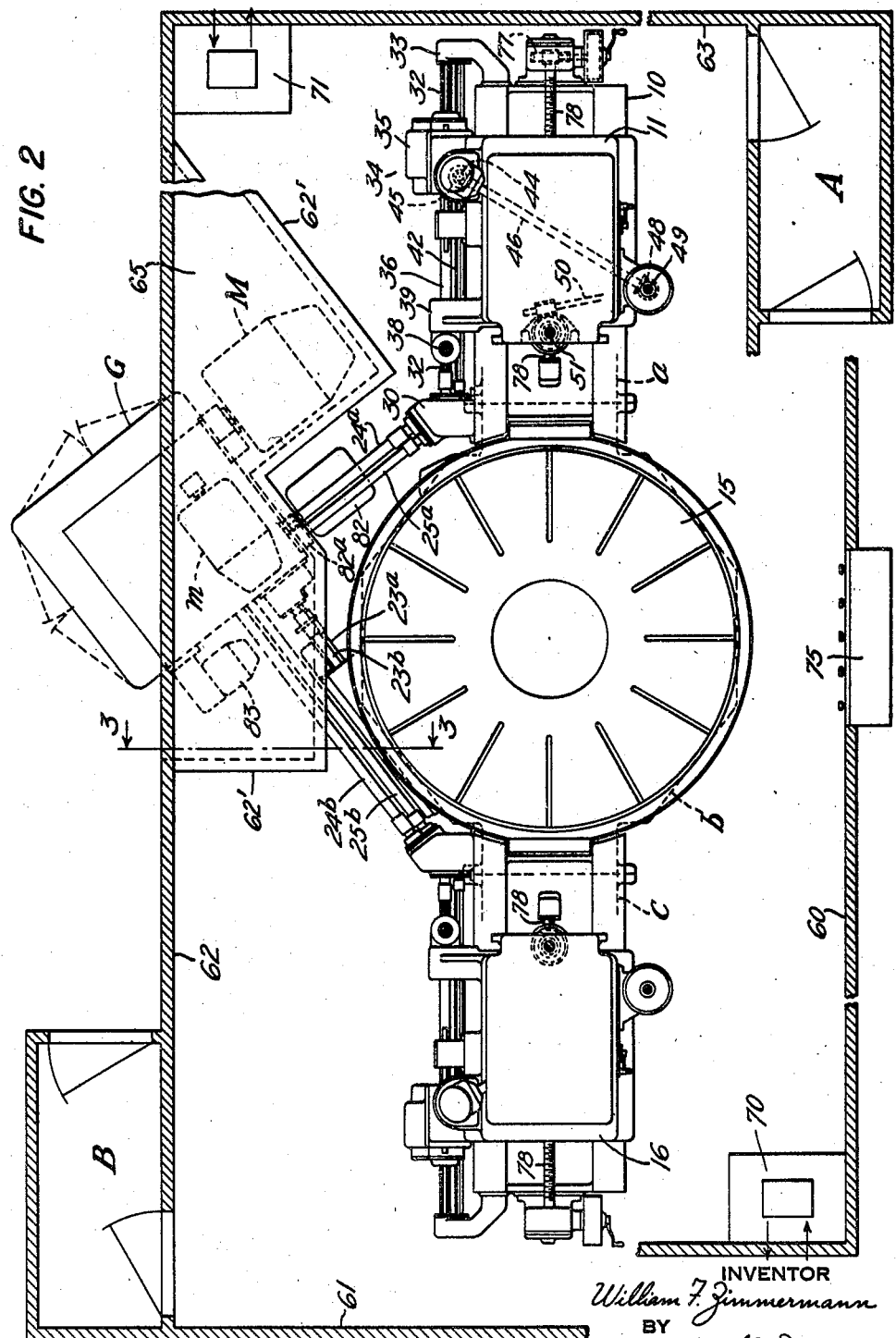

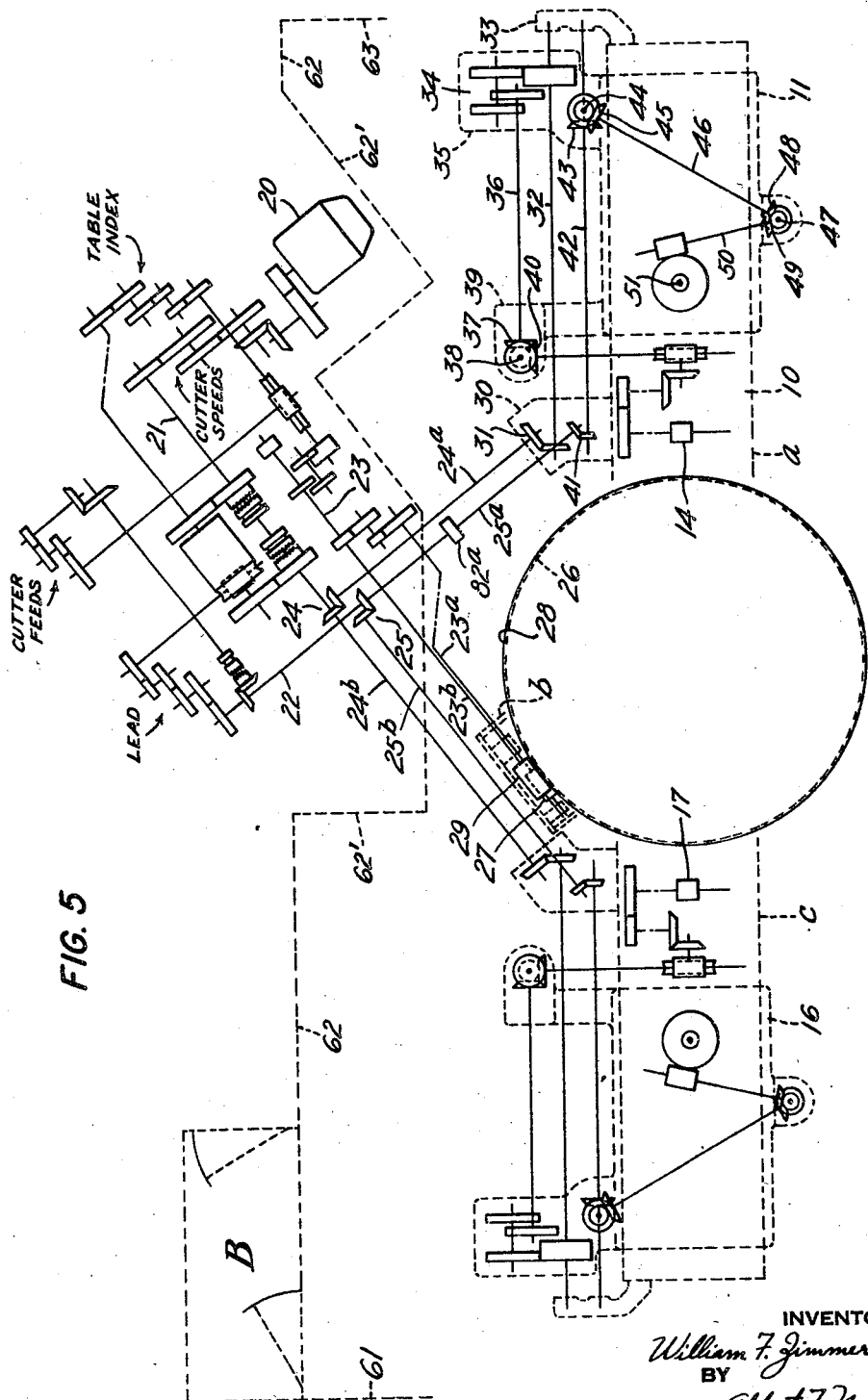

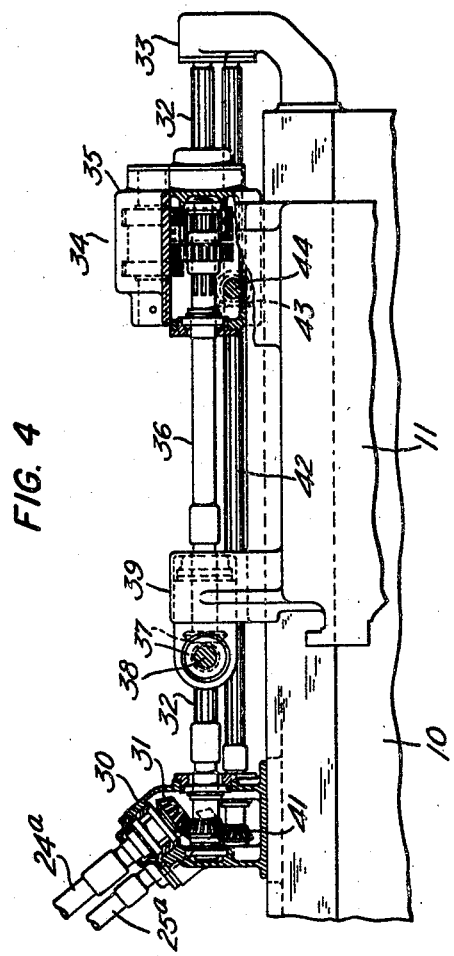

2,330,167

UNITED STATES PATENT OFFICE 2,330,167

THERMALLY INSULATED HOBBING MACHINE

William F. Zimmermann, Maplewood, N. J., assignor to Gould & Eberhardt, Newark, N. J., a corporation of New Jersey Application November 13, 1939, Serial No. 304,037

16 Claims. (Cl. 90—4)

The present invention concerns improvements in the construction and operation of machine tools and relates more particularly to an improved method and apparatus for hobbing gears free from the errors introduced by changes in temperature in various elements of the machine organization, the effect of which is to cause variations in helix angle and pitch line diameter from one face of the gear to the other.

The primary aim of the invention is to prevent the heat generated by the driving elements of the machine from being transmitted to, and from having any effect upon, other elements and members of the machine such as would change or otherwise distort a predetermined precision relation in alignment of those members. In the hobbing of gears, for example, and particularly gears of relatively wide face and large diameter, several days of continuous cutting may be required to finish the teeth of one gear. Extreme care and accuracy in settings and relations are essential in all phases of the operation, not merely in the initial set-up of the machine, but throughout the hobbing operation on a given gear or set of gears. And during the cutting operation the temperature from night to day may change as much as 20° or more.

The hobbing of large gears requires massive and extensive machines, so extensive, in fact, that a warming up of drive motors, bearings, shafts, etc. situated at one end of the machine produces a corresponding distortion in the frame in a particular region or zone which is not felt in more distant portions of the machine. Likewise large masses such as the base of the machine, stanchion, the gear blank itself, etc. cool or warm up very slowly as compared to the parts of lighter sections such as the lead screw, etc. Knowing the coefficient of thermal expansion of iron to be .00006" per inch, per degree change in temperature, a 20° change in room temperature will alone affect the bed of a 30 foot machine as much as $\frac{1}{16}$ of an inch. In consequence of such non-uniform expansion and contraction, pronounced changes in alignment of parts and in the precision relation between tool and work are brought about causing serious errors to be introduced in the finished product.

In the manufacture of high speed turbine gears for marine work the greatest precision is required to produce gears capable of meeting the demands and requirements placed upon them. A very slight run-out in a gear travelling at high speed will cause excessive noise and highly objectionable vibration and in a relatively short time expensive replacement parts become necessary. By the present invention, it has now been made possible to maintain and preserve uniform thermal conditions in the machine throughout the gear cutting operation and the error in the finished product heretofor due to such variations has been eliminated.

When machines embody a number of relatively movable elements, such as in a gear hobbing machine, the importance and need for initially establishing and thereafter maintaining perfect synchronism in movements and perfect alignment of the moving parts, cannot be over estimated. Heretofore little or no regard has been given, in the design of machine tools of this character, to the effects of temperature variations on the precision relation of the several coacting elements of the machine. The present invention further aims to render available a machine that is maintained free of distortion and unaffected by variations in the temperature of the main driving transmission elements and motor to the end that a high degree of accuracy may be obtained and maintained throughout its performance.

A further aim of the invention is to improve the operation and maintain high standards of accuracy in the functioning of a machine by establishing and maintaining a predetermined atmospheric condition about the machine as a whole and effectively insulating closely related elements thereof from external changes so as to render the critical members of the machine immune to external variations.

Heretofore hobbing machines were customarily built as complete self-contained machines with transmissions, motors, etc. built in and concentrated within the main frame thereof. In attaining the objectives of this invention it is proposed to construct the machine on entirely different lines, and to so arrange the driving elements of the machine so that all main drive shafts and bearings therefor are located externally of the machine proper. The heat generated by such shafting and bearings as may subsequently develop as the tooling operation progresses, will not therefore be confined to, or trapped within, particular portions of the machine frame and hence will not be localized. Toward the same end, it is further proposed to construct the drive motor or motors and change speed transmission mechanisms as a separate independent unit and to isolate the unit from the main frame of the machine so that the heat generated thereat is not transmitted to the main frame which would cause a distortion and misalignment of one part relative to another.

By way of still further improving operating conditions the invention also proposes to provide an enclosure for the machine proper whereby its four sides and top, segregating and isolating all heat producing elements thereof, may be thermally isolated and thereby insulated not only from such elements, but from generally prevailing atmospheric conditions of the plant. The enclosure is constructed of thermal insulating material and provided with appropriate double doors to permit access to the machine without sudden change in temperature. Overhead removal panels, sufficiently large to permit the largest of workpieces to be loaded upon and removed from the machine are also provided.

An enclosure of such character renders the machine immune to the effects of variations in external atmospheric conditions and also immune to the heat generated by the main drive motor or motors and from within the gear box of the machine. And by locating one or more air conditioning units in the enclosure, the temperature and condition of the air about the machine may be controlled and maintained constant within narrow limits. Such shafting and bearings as are necessary to conduct the power from the outside of the enclosure to the several operating elements of the machine, are as has been indicated above, journaled outside of the main frame work of the machine proper, and are maintained at a substantially uniform temperature by the continuous circulation of conditioned air.

By this invention it will be apparent that neither the heat generated by various elements of the power transmission, nor that of the continually varying atmosphere, has any effect upon the precision operation of a machine so constructed and once the machine is set up for a given precision operation, its initial accuracy remains constant throughout the operation or a succession of operations.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Fig. 2 is a plan view thereof illustrating a preferred relation of the main elements of the power drive to the machine and to the enclosure for the machine.

Fig. 3 is a vertical section taken along line 3—3 of Fig. 2.

Fig. 4 is a detail view partly in section illustrating the external mounting, to both base and stanchion, of the bearings for running shafting.

Fig. 5 is a line diagram of the entire drive.

Figure 1:
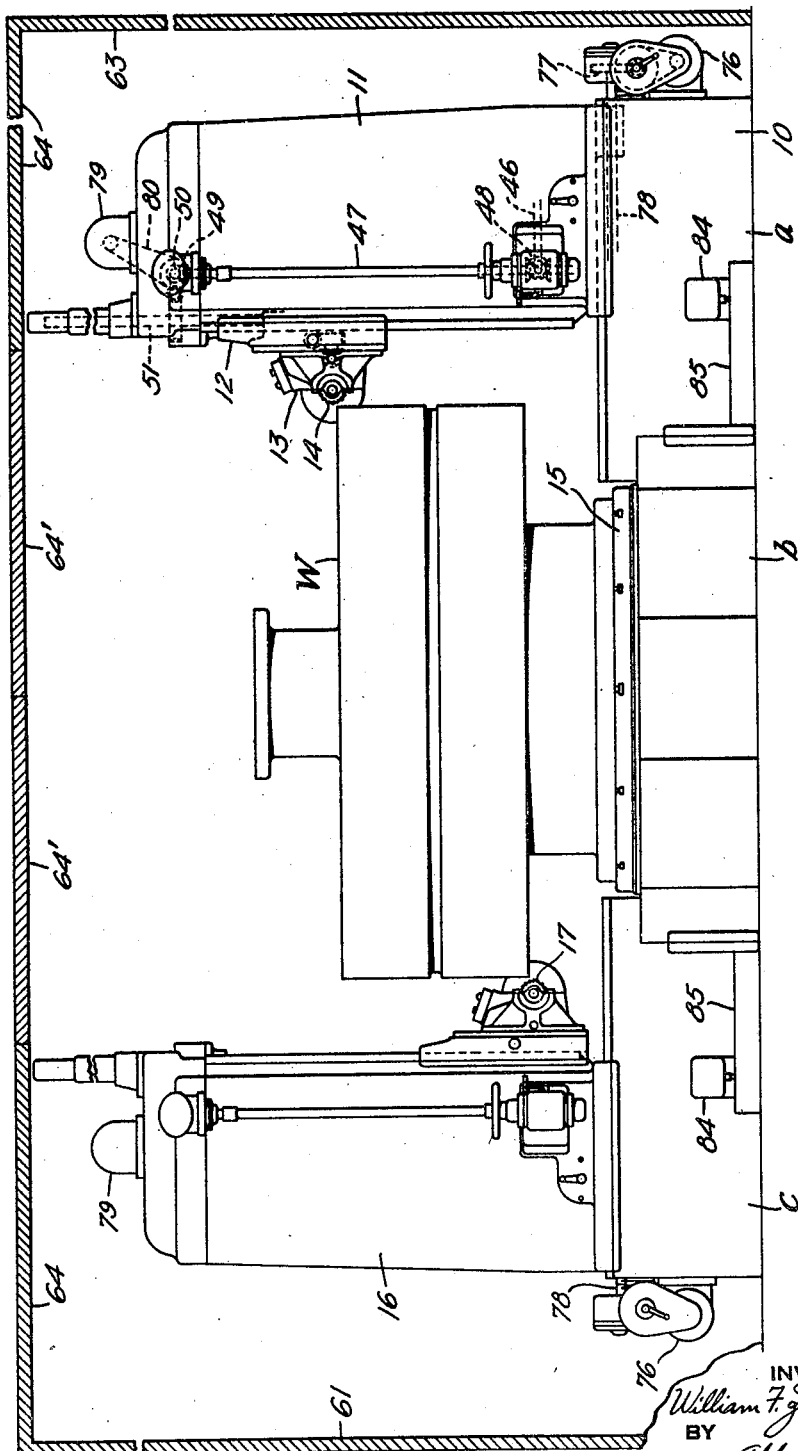
Figure 1 is a side elevation of a machine organization embodying this invention.

Referring to the drawings the invention is illustrated in connection with a gear hobbing machine which comprises a base 10 upon which is mounted for translation toward or away from the workpiece W, a cutter stanchion 11. The front of the stanchion has mounted thereon a vertically translatable cutter slide 12 which supports an indexible cutter carriage 13 and rotatable cutter 14. The base of the machine 10 may be constructed in units such as illustrated at a, b, and c, of which the units a and c are stanchion bases and the unit b an indexible table base. A work table 15 rotatably mounted in the bearings provided in the base b is adapted to have mounted thereon the workpiece W and to rotate the same synchronously with the rotation and feed movements imparted to the hobs 14 and 17.

A similar cutter stanchion 16 is located at the opposite side of the work blank and the cutter 17 thereof is, in the case of cutting the herringbone gear, arranged to feed up, in synchronism with the down feed of the cutter 14 during the operation of cutting teeth on its respective portion of the work blank W.

With reference to Fig. 5 of the drawings, the main drive to the work table and to both cutters is derived from a main motor 20 (in this instance 20 H. P.) which operates through the change speed mechanism indicated, to drive a main cutter drive shaft 21, a main cutter feed shaft 22 and a main table index shaft 23. It will be understood that the relative speeds and feeds of these elements are properly co-ordinated to effect the proper cutting of teeth on the work blank.

A pair of bevel gears 24 divides the cutter drive into two branches 24a, 24b, each branch leading eventually into one of the cutter carriages for driving the hob. Similarly a pair of bevel gears 25 divides the cutter feed drive into two branches 25a, 25b, each leading eventually to the feed mechanism of the tool slides 12.

In the present machine there is but one rotatable work table, there are preferably two parallel arranged drives, therefor, a roughing drive through worm gear wheel 26, worm gear 27 and drive shaft 23a, and a finishing drive through worm gear wheel 28, worm gear 29 and drive shaft 23b. This table drive is described and explained more fully in my copending application, Serial No. 260,080 and need not, therefore, be explained in detail except to state that the table is rotated solely by either the roughing drive or the finishing drive and never by both of said drives simultaneously.

As will be observed from Figs. 2 and 5, the shafts 23a and 23b, 24a and 24b, and 25a and 25b, form the only connection between the main source of power and speed change mechanism and the main frame of the hobbing machine. Accordingly, any heat that is generated by the main or supplementary motors and by the change speed gearing within the distantly located gear box G, is not transmitted or induced directly to the main frame of the machine. Such heat that may develop at the bearings located at the machine ends of the shafts is restrained from entering the main frames of the machine by the journaling of such bearings to the external surface thereof and preferably in separate brackets.

Referring more particularly to the right hand portion of Fig. 2, the shaft 24a is journaled in bearings provided by a bracket 30, and bevel gears 31, also journaled therein, transmits the power to a splined shaft 32 which has at its opposite end a bearing in an external bracket 33. A reversing mechanism indicated generally at 34 journaled externally on the translatable stanchion in housing 35, transmits the power selectively in reverse directions to a shaft 36 and from there through bevel gears 37 to a vertical splined shaft 38. The journals for the bevel gears 37 are provided by an external bracket 39, also secured to the translatable stanchion 11. A second pair of bevel gears 40 journaled in the vertically translatable tool slide 12 transmits the motive power to the hob 14 in the known manner.

The cutter feed is from shaft 25a through bevel gears 41, to splined shaft 42, thence through bevel gears 43 to a short vertical shaft 44 to bevel gears 45 on a horizontal shaft 46. All journal bearings for the gears and shafting 41—46 are located externally of the frames as shown in Figs. 1 and 2.

The horizontal shaft 46 transmits the power to an external vertical shaft 47, journaled at the opposite side of the machine, through bevel gears 48. From shaft 47 the power enters the machine through gears 49 and a single shaft 50 and drives the cutter feed screw 51.

The drive and feed of the cutter 17 on the stanchion to the left in Fig. 2, is substantially identical with that just described and a description of one is thought to be sufficient. It will be observed, however, that in all instances, all of the bearings for the several drive shafts indicated, and all bearings for the various power transmitting gears whether they are fixed in space or translatable, are journaled in brackets secured to the external surface of the main frames of the machine. Such bearings and shafting are, therefore, substantially completely surrounded by moving air currents and any slight heat or warmth that may be generated is immediately dissipated and there is little danger, if any, of any localized heating of the main frames or of the moving parts thereof such as would distort such parts and bring about a corresponding error in the precision cutting of the gear teeth.

The bearings for the table driving worms 27 and 29 in their respective shafts are provided by a separate bracket bolted to the table base b and any warmth that may develop at such regions is not transmitted to the table or table base, except indirectly.

A power drive so arranged has the further advantage that all of the primary power transmitting elements are conveniently accessible for subsequent replacement or repair without any material dismantling of the machine as a whole. Moreover, the machine so designed lends itself readily adaptable to manufacture on the unit principle and shipped or otherwise transported in a like manner and thereafter conveniently assembled at the location or site selected.

In addition to provisions herein made for conducting and dissipating the heat that may develop at the externally mounted bearings and journals for the several main drive shafts, it is further proposed to enclose the entire machine, with the exception of the main transmission housing and drive motors, in an enclosure by means of which the machine proper may be isolated from the atmosphere generally prevailing in any plant. Figs. 1 and 2 illustrate a preferred form of enclosure for the machine proper which comprises four side walls 60, 61, 62, 63, and a roof 64. The walls and roof of the enclosure are constructed of a thermal insulating material of a suitable character and is intended to be permanent in nature.

At convenient locations of the enclosure, preferably at the front end and at the rear of the machine, double door entrances A and B are provided to permit access to the machine by one or more operators. The double door arrangement at the entrances, located at least at two points about the machine, afford convenient access thereto and at the same time prevents too rapid or sudden changes in the temperature or condition of the atmosphere within the enclosure.

The lower portions of the rear wall 62 of the enclosure follows the general outline of the transmission housing G and drive motors M, m, as illustrated at 62' in Fig. 2. The walls 62' rise from the floor to a point clearing the motors and transmission housing and are overlaid by a removable cover section 65 which extends to the outer edge of the enclosure, as indicated in Fig. 3, where it joins with the main vertical wall 62. Recessed vertical walls 62' are also removable to permit the assembling of the several machine units and to render the making of subsequent adjustments or alterations to the mechanism possible. The roof portion 64 of the enclosure is formed with one or more removable panels 64' which may be displaced so that the workpiece W may be moved therethrough by an overhead crane. All switches and control relays for governing the action of the machine are located away from the machine in a control panel box 75 which may be built in or attached to the enclosure wall 60 in a position convenient to the operator's normal working station.

In this way the main frame of the machine may be isolated from the main transmission and heat producing elements in a practical and effective manner and the transmission itself rendered freely accessible for the purpose of making changes in cutter speeds, feeds and table movements, from the outside of the enclosure. Any heat generated by the transmission and particularly the heat given off by the main motors is effectively isolated from the main machine and there is consequently no danger of any localized expansion or contraction of members or elements of the main machine as would disturb the precision relation of the cutter and the work. If desired a separate enclosure for the transmission unit of the machine may be provided.

To further assist in maintaining a uniform atmospheric condition, air conditioning units indicated at 70, 71 are proposed for maintaining a continuous circulation of air at a controlled temperature about the machine. The temperature of the machine itself may thereby be maintained at a substantially constant value and may be depended upon, irrespective of the temperature or condition of the external atmosphere, to perform its intended operation continuously without variation. It is important, however, that the air velocity from the ducts supplying the constant temperature be sufficiently high quickly to raise or lower the temperature of the object, such as a work blank or fixture, brought into the room, and to maintain not only a constant temperature but an equal temperature throughout the room. Such a controlled circulation of air about the machine, in addition to carrying off and dissipating any temperature rise at the several bearing brackets, also tends to carry off and dissipate heat they may develop by reason of the action of the cutter in performing the tooling operation.

The drives hereinbefore explained constitute the main drives to the cutter and work table and normally are in continuous operation. The machine, however, embodies still further power transmissions for effecting a power adjustment of certain of the major elements. For example, a stanchion traverse motor 76 secured to the outer end of each of the stanchion bases (see Fig. 1) is provided for adjusting the stanchions 14 and 16 toward and from the workpiece. Each of the motors 76 operate through an independent train of mechanism indicated generally as 77 and serve to drive the stanchion feed screw shaft 78 selectively in reverse directions.

Likewise, a motor 79 mounted at the top of each stanchion provides an independent drive for quickly raising or lowering the tool slide 12. Each of the motors 79 operates through the V belt 80 to drive the elevating worm shaft 50 and its associated slide elevating mechanism 51. A third motor 82 is operatively connected, by gearing indicated at 82ª, with the feed shafts 25ª and 25ᵇ for traversing both tool carriages simultaneously when desired.

As such motors are used only infrequently and normally are at rest throughout the actual tooling operation, they do not in themselves constitute a heating plant or plants which has any material effect upon the machine structure as a whole.

Lubricating motors such as indicated at 83 (see Fig. 2) which continuously operate to force lubricant under high pressure to all bearing and sliding surfaces of the machine, and generate appreciable heat in driving a high pressure lubricant pump, are also located outside of the thermal enclosure so the variation in temperature thereof has no effect upon the machine proper.

A cutting lubricant and cooling motor 84 supplies a copious quantity of lubricant at low pressure to the respective cutters and does not because of its low pressure duty overheat. Such a motor may, therefore, be at the sump 85 adjacent the main frame of the machine.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A machine tool subject to error incident to temperature changes combining a main frame, a tool support and a work support mounted thereon, and power means for actuating the tool comprising a plurality of shafts, bearing means for journaling said shafts to the external surface of said main frame and spaced therefrom, a single shaft connecting said externally mounted shafts to the ultimate elements of the tool actuating mechanism, a main drive and change speed transmission housing physically separate from said main frame and located at a distance therefrom, said housing having mechanisms therein for determining the relative rates of movement between the said tool and said work support, and a relatively long power shaft connection extending from said mechanisms of said separated transmission to said externally journaled shafting of the main machine for actuating said tool whereby any rise in temperature developing at the said physically separate transmission housing is dissipated in the air by virtue of the distant location of the housing from the main frame and the external mounting of the power shafting on said frame.

2. A machine tool combining two upright standards, a translatable tool carriage mounted upon each of said standards, a tool rotatably mounted in each of said carriages, a work support common to both of said standards and power means separate from the said standards for translating said carriages and for rotating said tools comprising a main power transmission unit physically spaced from and distantly located with respect to said standards, said distant transmission unit including a prime mover and mechanisms for determining the rates of tool rotation and carriage translation relative to the workpiece and power shaft connections extending from said distantly located main transmission unit to each of said tool and carriages of the machine for actuating the same.

3. A machine tool combining two upright standards, a vertically translatable tool carriage mounted upon each of said standards, a tool rotatably mounted in each of said carriages, a single work support common to both of said standards, and a common power means for translating said carriages and for rotating said tools consisting of a motor, change speed transmission mechanisms, and a transmission housing for said power means physically separate from and distantly located with respect to said standards and work support; power transmitting means connected to the said transmission mechanisms of said separate housing and with the said movable elements of said standards and traversing the distance therebetween for effecting relative movement between the tools and the workpiece at a selected rate; said spaced relation of said power means and said standards serving as means for thermally isolating the said motor, transmission and transmission housing from both of the said standards thereby to maintain the standards and work support free of the effects of temperature changes occurring at the distantly located motor and change speed mechanisms during the operation of the power means.

4. A machine tool in which distortion of the members due to temperature variations introduces errors in the finished work combining a main frame adapted to support a workpiece and a tool in cooperative precision relation; a physically separate and distantly spaced main power transmission, said transmissions including speed ratio determining mechanisms for effecting relative movement between said tool and workpiece at a predetermined rate to perform a tooling operation, relatively long power shaft connections traversing the distance between said transmission and said main frame, said long shafts providing the only power transmitting coupling between the main frame and said distant transmission unit; bracket means for journaling said connections to the exterior surface of said frame in spaced relation therewith; said bracket means and said spaced relation of said main frame and main power transmission cooperating to facilitate dissipation of any heat radiating from said transmission or generated at said external journal bearings and thereby maintain the machine as a whole at a preselected temperature throughout the tooling operation.

5. A machine tool having in combination a main frame; a tool carriage mounted thereon, a tool rotatably mounted in said carriage, and power means for feeding said carriage and for rotating said tool comprising a carriage feed train of mechanisms and a tool driving train of mechanisms, each train including a plurality of shafts, bearing means for journaling said shafts to the exterior of said main frame and spaced therefrom, operative connections between one of said externally mounted shafts and the tool and between another of said shafts and the carriage, a main transmission housing constituting a physically separate unit and located at a distance from said main frame, said distant unit including a drive motor and a plurality of rate selecting and coordinating mechanisms for controlling the relative rates of tool rotation and carriage feed, and relatively long power shaft connections between said transmission unit and said externally journaled shafting of the machine for actuating said tool and carriage.

6. A machine tool combining a standard, a translatable tool carriage mounted thereon, a tool rotatably mounted in said carriage, and means for translating said carriage and for rotating said tool in timed relation comprising a plurality of shafts, bearing bracket means for journaling said shafts to the external surface of said standard, a single shaft connecting one of said externally mounted shafts to the ultimate elements of the tool rotating and to the ultimate elements of the carriage translating mechanism respectively, a main transmission housing separate from said standard and located at a distance therefrom, said transmission housing having journaled therein a plurality of change speed mechanisms operatively related as to coordinate the rates of movement of said tool and said carriage; and relatively long power shaft connections between the change speed mechanisms of said main transmission and said externally journaled shafting of the machine for actuating said tool and carriage at rates determined by the said distant change speed mechanism, said long power shaft connections affording the only physical connections between the main machine and its transmission.

7. A machine tool in which distortion of the members due to heating introduces errors in the finished work combining a main frame adapted to support a workpiece and a tool in cooperative relation; a physically separated and distantly spaced power transmission housing including a driving motor main drive gearing for effecting relative movement between said tool and work piece at selected speeds to perform a tooling operation, power shaft connections extending between said housing and said main frame, bearing bracket means for journaling said shaft connections externally of said frame and spaced therefrom, and means including the air gap between said main frame and said separate and distant transmission for thermally insulating said transmission housing from said main frame to isolate said frame and parts supported thereon from the heat generated at said transmission housing; and shaft means also journaled in said bracket for conducting the power delivered to the machine through said long shaft connections to said tool and workpiece.

8. A machine tool combining a main frame, a work support rotatably mounted thereon, a tool slide translatably supported on said frame, and a tool spindle rotatably journaled on said slide; power means for driving said work support, tool slide, and tool spindle comprising a physically separated power transmission including a main drive motor and power dividing gearing located at a distance from said main frame, a partition wall between said transmission and said main frame for insulating the latter from the heat generated at and by the former; and means comprising a work table drive shaft, a tool slide drive shaft, and a tool spindle drive shaft extending through said partition wall and severally connected at one side thereof with related elements of said transmission and at the other side with gearing journaled on said main frame for transmitting motive power from the physically spaced transmission to said work support, tool slide, and tool spindle respectively, at rates determined by said power dividing means.

9. A machine tool combining a main frame, a work support rotatably mounted thereon; a rotatable tool spindle also supported on said frame; power means for driving said work support and tool spindle comprising a physically separate power transmission located at a distance from said main frame, said transmission including a main driving motor, change of speed and reversing mechanisms, and at least two terminal driven elements; a partition wall between said transmission and said main frame; and means comprising a relatively long shaft extending through said partition and connected at one end with one of said terminal elements of the transmission at one side of the partition and at the other end with gearing journaled on said main frame at the other side of the partition for transmitting motive power from the spaced transmission to said work support; and a second relatively long shaft extending through said partition and connected at one end to the other of said terminal driven elements and at its other end with gearing journaled on said main frame for transmitting motive power from said transmission to said tool spindle.

10. A machine tool in which distortion of the members due to temperature variations creates errors in the finished work combining a main frame adapted to support a rotatable work table and a tool in cooperative precision relation; a separate and distantly spaced main power transmission unit including a main drive motor for effecting relative movement between said tool and workpiece to perform a tooling operation; a first set of power shaft connections traversing the distance between said main frame and the said spaced transmission unit; means at the main frame end of said power shaft connections for conveying the power from said connections to said tool including a plurality of shafts supported exteriorly of and spaced from the said main frame; and a second set of power shaft connections traversing the space between said power transmission and said main frame for driving said work table; said spaced relation of the main frame and the power transmission unit and the exterior and spaced mounting of said shafts providing air gap means effective to absorb and dissipate the heat generated at said transmission.

11. In a machine tool having a rotatable work table, a rotatable and translatable tool spindle, means for maintaining a precision relation between said elements uneffected by heat generated at the power source comprising a main frame adapted to support said work table and tool spindle in cooperative precision relation; a physically separated and distantly spaced main power transmission unit including a main drive motor for operating said tool spindle and work table to perform a tooling operation; power connections traversing the distance between said main frame and said power transmission; means at the main frame end of said power connections for transmitting the power to said tool spindle and to said rotatable table including a plurality of shafts supported exteriorly of and spaced from the said main frame to provide heat dissipating air gaps therebetween; and means at said distantly spaced transmission unit for coordinating the movements of the work table to the movements of the tool spindle.

12. A machine tool in which heat generated by the main driving transmission creates errors in the finished work combining a main frame adapted to support a workpiece and a tool in cooperative precision relation; a physically separate and distantly spaced second frame for supporting and housing the main driving transmission for the machine, said transmission including a main drive motor for effecting relative movement between said tool and workpiece to perform a tooling operation; a power shaft traversing the distance between said main frame and said second frame for transmitting motive power from the latter to the former; means at the main frame end of said shaft for transmitting the power to the tool including a plurality of shafts each supported exteriorly of and spaced from the said main frame; and adjustable means at the other end of said transmitting shaft and situate mechanically between said motor and said end of the shaft for predetermining the rate of movement of said tool in relation to the workpiece.

13. A gear hobbing machine tool having a tool spindle and work support adapted to be power driven in correlation, the combination of a main frame for supporting said spindle and work support in precision tooling relation; a power plant for driving said spindle and work support comprising a housing physically separate from said main supporting frame and situated at a distance from said main frame; a barrier wall extending between said main frame and said housing, said barrier wall being spaced from said main frame as to afford a substantial air gap therebetween; and relatively long shaft elements operatively connected to the power plant on one side of said barrier wall and with said main frame and the spindle and work support thereon on the other side of said barrier wall, said long shaft elements extending through the barrier wall and traversing the air gap between the said barrier and the main frame, said distant location of the power transmission, long shaft elements, barrier wall, and air gap affording means for keeping the heat generated at said power transmission away from the main frame of the machine thereby to maintain the main frame and the precision relation between the tool spindle and work support free of the effects thereof.

14. A machine tool in which distortion of the tool or work supporting members due to localized temperature variations creates errors in the finished work combining a main frame organization adapted to support a workpiece and a tool in cooperative precision relation; a coacting separate and physically separated main power transmission organization comprising a main drive motor and speed change gearing for effecting relative movement between the tool and work to perform a tooling operation; a partition wall extending between said physically separated organizations, said wall being spaced from each of the separated organizations and adapted thermally to shield the said main frame members from the heat generated at said separated power transmission; and relatively long shaft means extending through said separating partition wall for conducting motive power from the main drive motor and speed change gearing situated on one side of the separating wall to the driven elements of the main frame organization situate on the other side of said separating wall.

15. A machine tool embodying at least two elements adapted to be power driven and maintained in predetermined precision relation combining a first frame member for supporting said elements; a second frame member spaced therefrom, power dividing and rate determining means mounted to said second frame member, a source of motive power also spaced from said first frame member common to said power dividing and rate determining means for driving same, and two sets of power transmitting means connected at their one ends to said elements on said first frame member and at their other ends to said power dividing and rate determining means, said connections traversing the space between said two spaced frame members whereby the heat generated at the one has little or no effect upon the precision relation of the elements supported on the other.

16. A machine tool combining a main support, at least two mechanisms journaled thereto adapted to be power driven in synchronism, a second support physically separate from said main support, ratio determining and correlating mechanisms for the said mechanisms of the main support journaled to said second support, and at least two power transmitting connections extending from the respective ultimate elements of said ratio determining and correlating mechanisms of the second support to the respective initial elements of said mechanisms of said main support and traversing the distance between said supports for transmitting power from the synchronizing mechanism to the mechanisms to be driven whereby the mechanisms of the main support are synchronously driven and uneffected by temperature variations occurring at said second support.

WILLIAM F. ZIMMERMANN.